(No Model.)
J. H. SHAW.
KNOB ATTACHMENT.
No. 599,363. Patented Feb. 22, 1898.
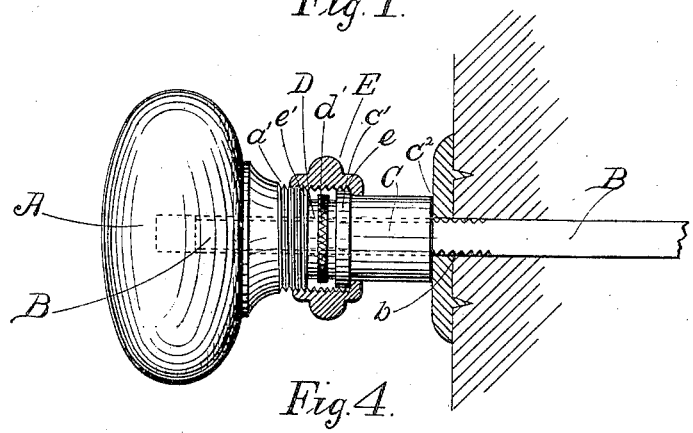
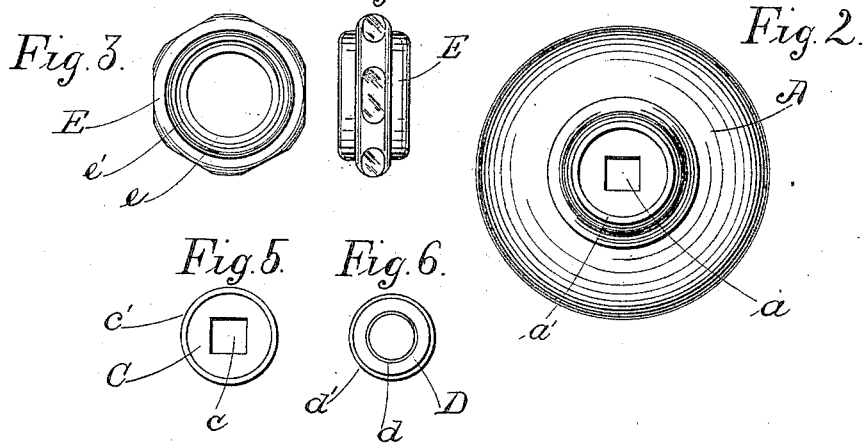
WITNESSES:
H. Coleman
G. W. Adams
INVENTOR.
John H. Shaw
BY Robinson & Fisher
ATTORNEYS.

UNITED STATES PATENT OFFICE.

JOHN H. SHAW, OF NEW HAVEN, CONNECTICUT, ASSIGNOR TO THE SARGENT & COMPANY, OF SAME PLACE.

KNOB ATTACHMENT.

SPECIFICATION forming part of Letters Patent No. 599,363, dated February 22, 1898.

Application filed May 6, 1897. Serial No. 635,364. (No model.)

*To all whom it may concern:*

Be it known that I, JOHN H. SHAW, of the city and county of New Haven, in the State of Connecticut, have invented a new and useful Improvement in Door-Knobs, of which the following is a full, clear, and exact description, taken in connection with the accompanying drawings, which form a part thereof, and in which—

Figure 1 represents a side elevation, partly in longitudinal section, of a door-knob embodying my invention; Fig. 2, an end view of the knob itself; Figs. 3 and 4, end and side elevations of the collar; Figs. 5 and 6, end views of the neck or shank and nut, respectively.

In all figures similar letters of reference represent like parts.

This invention relates to door-knobs, and has for its object the construction of a door-knob which may be accurately adjusted longitudinally on its spindle to fit snugly against the escutcheon or frame of the door and at the same time be prevented from any possible disadjustment in the ordinary movements of the knob in operating the lock to which its spindle is connected or in opening or closing the door.

To this end the invention consists in a knob the shank of which is formed separate therefrom and which, with the knob, is incapable of rotary movement independent of the spindle, while a nut interposed between the knob and shank regulates their proper position on the spindle, the nut itself being so protected that it cannot unintentionally be rotated, as set forth hereinafter.

In the drawings, A represents a door-knob, and B a spindle, separate therefrom, rectangular in cross-section, the corners $b$ being screw-threaded in well-known manner. The knob is provided with an axial perforation $a$, rectangular to correspond with the spindle, so that the knob may be moved at will longitudinally on the spindle B, but is held against rotation thereon.

The shank C of the knob A is formed independent therefrom and has a similar axial perforation $c$ to permit it to move on the spindle B in similar manner to the knob A.

A nut D, internally threaded at $d$ to screw on the spindle B, is knurled on its periphery $d'$ to be readily operated.

A hollow cylindrical collar E is provided with an inwardly-extending flange $e$ at one end and an internal thread $e'$ at its other to engage with an annular flange $c'$ on the shank C and an external threading $a'$ on the knob.

The parts are assembled by first slipping the collar E over the shank C, so that their respective flanges $e$ and $c'$ are in engagement, whereupon the shank C is fitted on the spindle until its end $c^2$ is in contact with the escutcheon or door. The nut D is screwed onto the spindle to fit snugly against the shank C, Fig. 1, and the knob A is brought on the spindle into juxtaposition with the nut D. Finally the collar E is drawn over the nut and screwed onto the end of the knob until all the parts are fast. By this construction as the nut and spindle are threaded the exact position desired for the knob on the spindle may be obtained. The engagement between the knob and shank and spindle provides that any rotary movement of the knob or shank is communicated to the spindle without unscrewing the nut on the spindle, and the collar securing the parts together is not in contact with the nut, but at the same time protects it from being unscrewed until the parts are separated.

Having now described my invention, what I claim, and desire to secure by Letters Patent, is—

1. In a door-knob, the combination with the knob with its shank formed separate therefrom; of an independent spindle on which the knob and shank are capable of longitudinal movement, and incapable of rotation independent therefrom; a nut adapted to be screwed on said spindle and fit between said knob and shank; and means for connecting said knob and shank and housing said nut, substantially as described.

2. In a door-knob, the combination with the knob; of the spindle formed separate therefrom; an independent shank, said shank and knob being capable of longitudinal movement on said spindle, and incapable of rotation independent therefrom; a nut adapted to be screwed on said spindle, and to fit between said knob and shank; and a collar adapted to fit loosely over said nut and be secured to said knob and shank, substantially as described.

3. In a door-knob, the combination with the knob having a rectangular perforation in its axial line; of a shank formed independent therefrom with a corresponding perforation; the spindle substantially rectangular in cross-section to fit within the perforation in the knob and shank, being also provided with screw-threading; a nut screw-threaded to engage with said spindle and adapted to fit between said knob and shank when on said spindle; and a collar adapted to fit loosely over said nut, and engage said knob and shank by means of a flange on one of said members and screw-threading on the other member, substantially as described.

In witness whereof I have hereunto set my hand this 4th day of May, A. D. 1897.

JOHN H. SHAW.

Witnesses:
FRANK L. KIRSCHNER,
LE ROY J. KIRKHAM.